July 24, 1962
K. HERTEL
3,045,322
CUTTING TOOL WITH REMOVABLE BIT
Filed Dec. 8, 1958
3 Sheets-Sheet 1
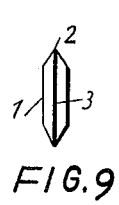
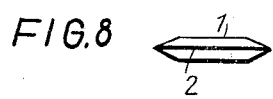
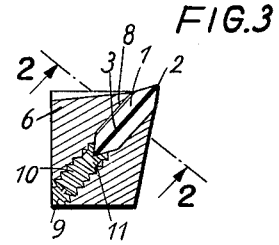
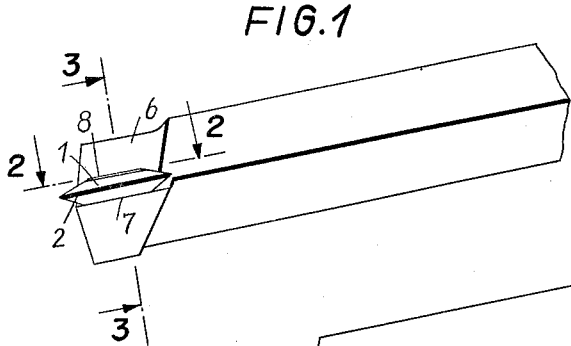
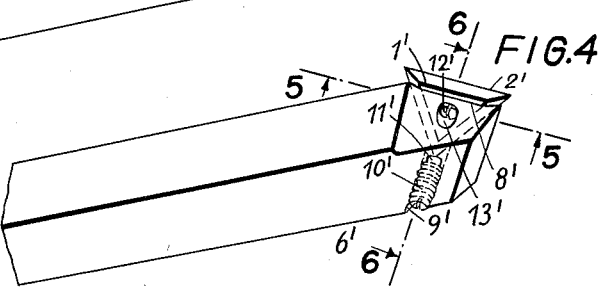
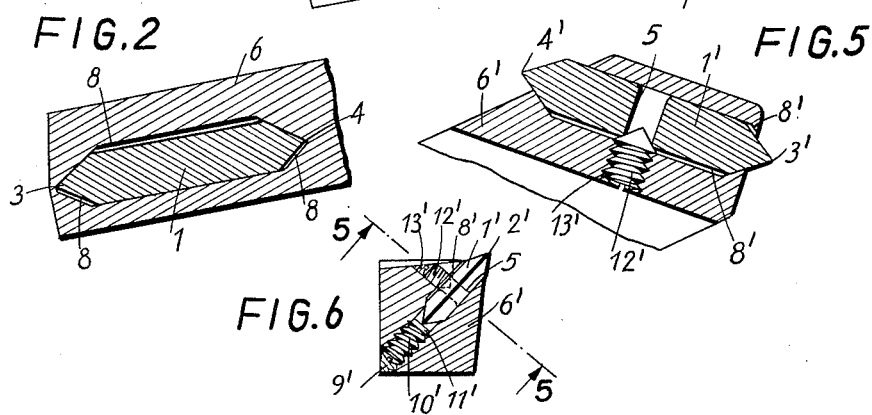
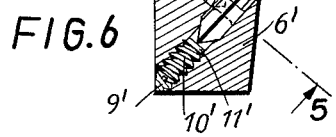
INVENTOR
Karl Hertel
BY George H Spencer
ATTORNEY July 24, 1962  K. HERTEL  3,045,322
CUTTING TOOL WITH REMOVABLE BIT
Filed Dec. 8, 1958  3 Sheets-Sheet 2
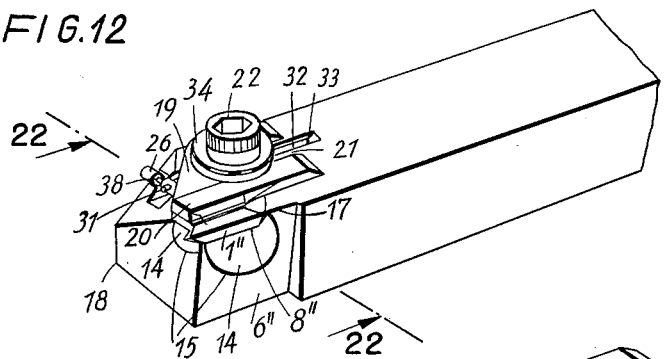
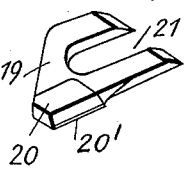
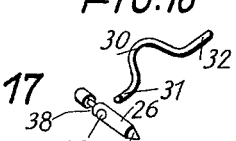
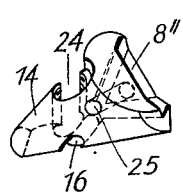
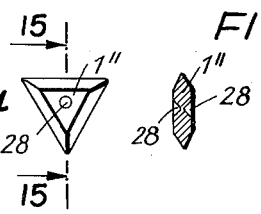
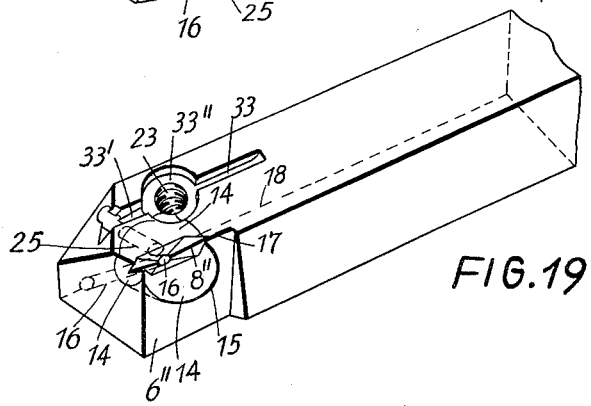
INVENTOR
Karl Hertel
BY George H. Spencer
ATTORNEY

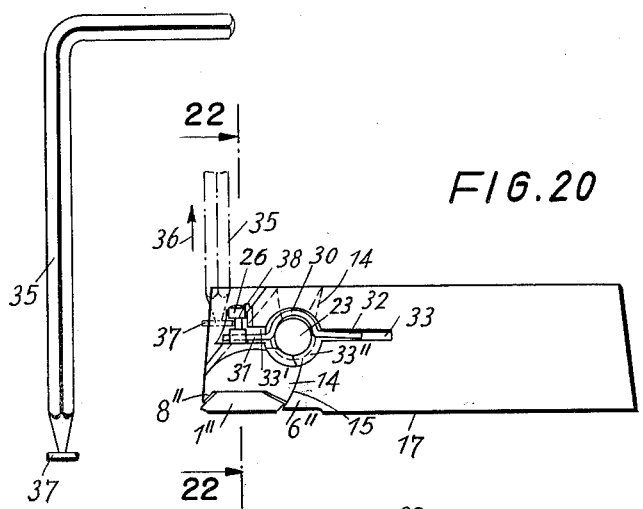
FIG. 21
FIG. 20
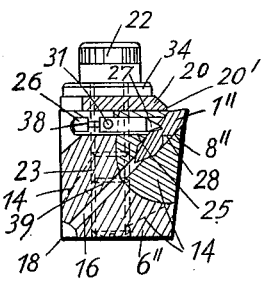
FIG. 22
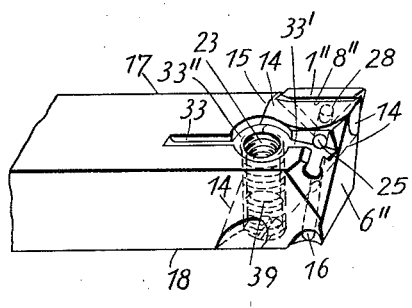
FIG. 23

United States Patent Office 3,045,322
Patented July 24, 1962

3,045,322
CUTTING TOOL WITH REMOVABLE BIT
Karl Hertel, Oedenbergerstrasse 29, Nurnberg, Germany
Filed Dec. 8, 1958, Ser. No. 778,958
Claims priority, application Germany Dec. 10, 1957
10 Claims. (Cl. 29—96)

The present invention relates to a cutting tool for lathes and similar machine tools which is provided with a removable cutting bit.

Cutting tools for machine tools with cutting edges consisting of a hard material may be divided into two different types. One type of these tools is provided with a small plate of hard metal which is soldered thereon, while the other type has a cutting insert or bit of a hard cutting material removably secured thereto. The latter type usually consists of a long elongated plate of hard metal which may be pushed forwardly when the dulled cutting edge has been reground. Since such regrinding always requires specially qualified personnel, many efforts have been made to produce such tools with exchangeable cutting bits of a hard material which are discarded and thrown away after the cutting edge has become dull, since regrinding them would not be worth the effort. This applies primarily to sintered metal oxides in which the material itself has a relatively low value. It applies, however, also to other, more valuable materials if the size of the cutting bit is sufficiently small.

There have been numerous prior embodiments of cutting tools in which such expendable cutting bits of hard metal or sintered metal oxides are secured to the tool holder by means of a suitable clamp. Some of these known cutting bits, usually in the form of small plates, are provided with a plurality of cutting edges. Thus, for example, a rectangular cutting plate has been provided with four cutting edges which may be alternately placed in the cutting position. After the different cutting edges have become dull, the plate is removed from the tool holder and discarded since regrinding it would not be worthwhile. However, when using such small plates, considerable difficulties are usually encountered in securing them properly to the tool holder, and frequently it is also rather difficult to adjust the cutting plate to the proper position in the tool holder and under the clamping member.

It is an object of the present invention to provide a cutting tool of the type and for the purposes as described which overcomes the disadvantages of similar prior tools with expendable cutting bits by simplifying the application, adjustment and exchange of these bits and by increasing the number of cutting edges thereof.

The present invention therefore provides a tool holder with a cutting bit or blade of a hard cutting material which is inserted into a recess in the tool holder which extends in a downwardly inclined direction and the cross-sectional area of which converges downwardly. The cutting bit according to the invention is made of a polyhedral shape, the three lateral surfaces of which are disposed toward each other like the surfaces of a trilateral pyramid. Another important feature of the invention resides in the fact that the tool holder is devised so that these three surfaces of the cutting bit positively engage with three wall surfaces of the corresponding mounting recess in the tool holder. Such corresponding shape of the cutting bit and the mounting recess for holding the same produces the advantage that the bit automatically retains itself in a fixed position within the recess under the action of the cutting pressure so that no additional securing means such as a clamping member will be required. The invention further attains the important advantage of a very secure mounting of the cutting bit, namely, by means of a so-called three-point bearing. The cutting bit will then be drawn tightly into the mounting recess like a wedge by the action of the cutting force and the three bearing surfaces.

Very particular advantages are attained by making the cutting bit of a plate in the shape of an equilateral triangle, and to provide each cutting edge in the form of a beveled roof-shaped side of such triangle wherein the two beveled surfaces define the front rake or cutting angle of the tool. Thus, the cutting bit according to the invention has three cutting sides. However, since in any cutting operation the entire length of the cutting edges is never used but only about one-half of such length beginning at one of the three edges, there are practically six cutting edges available which may be used successively by turning the triangular plate each time about an angle of 120° or by turning it over to change its sides.

For properly receiving and holding such a triangular bit, the mounting recess in the tool holder is made in the form of a slot of the shape of an equilateral triangle with an apex pointing in the direction toward the inside of the head of the tool holder. The cross-sectional shape of the recess corresponds to that of the cutting bit, namely, to one in which only every second outer surface engages with the respective corresponding wall surface of the recess. This also insures that in any position of adjustment only three surfaces of the cutting bit will engage with the surfaces of the recess so that the principle of a three-point bearing will also in this case be realized. The proper cutting position of the bit is attained by the fact that the slot-shaped recess as seen longitudinally thereof extends within the tool holder in a direction parallel to the cutting edge of the bit.

As previously indicated, the means for securing the cutting bit within the mounting recess consists in the wedging effect produced by the cutting force exerted upon the bit in connection with the particular position of the wall surfaces of the recess. In order to facilitate the removal of a cutting bit from the recess after it has been wedged into it by the cutting force, the recess is preferably continued at its lowest point in the shank or head of the tool holder in the form of a bore which extends in the same direction as the recess. A suitable pin or the like may then be inserted into such bore to push the cutting bit out of its mounting recess. This bore is preferably screw-threaded, and the pin preferably consists of a screw which when turned inwardly pushes the cutting bit out of its recess.

In order to protect the cutting point of the bit facing toward the mentioned bore from being damaged when the bit is being forced out of its recess, a cushion of a relatively soft material may be interposed between the bit-removing screw and the bit itself. The inner end of the screw will then act upon the soft cushion and only indirectly upon the cutting point of the bit to push the latter out of the recess.

For additionally protecting the cutting bit from falling out of its recess in the event that the tool holder might be turned about its axis, the triangular plate or blade forming the bit may also be tightened within the recess by a screw which is mounted within a threaded bore in the tool holder which extends into the recess from one side thereof and exerts a clamping action upon the bit. This clamping screw and its bore are preferably provided in the flat side of the mounting recess which is not in engagement with the bit. This has the advantage that the clamping screw not only prevents the bit from falling out of the recess but that the bit is thus additionally tightened against one of the walls of the recess which in any event serves as a contact surface.

A further improvement may be attained by providing the triangular cutting bit with a bore at the point of intersection of the bisectrices of its sides and coaxially to the threaded bore which extends laterally from one of the wide sides of the mounting recess. By the provision of such a bore in the cutting bit, the clamping screw will engage directly into the bit. The clamping screw, the cutting bit, and the walls of the recess may then be disposed in such a relation to each other that the screw will in effect form one of the three bearing points or bearing surfaces for supporting the cutting bit. The inner end of the clamping screw which engages from one side into the bore in the cutting bit may preferably be provided with a conical tip which enters into the bore in the bit to maintain the latter in its central position.

In the course of operation with such cutting tools it is sometimes unavoidable that the tool holder itself will be damaged within the area adjacent to the cutting bit. The present invention therefore further provides this surrounding area to be made in the form of a separate insert which contains the recess in which the cutting bit is mounted. In the event of any damage to the insert the same may be easily removed and replaced by a new insert so that the entire tool may be quickly reconditioned for immediate service.

In order to insure a simple and reliable securement of the insert within the head of the tool holder the present invention provides this insert to be of a conical shape, preferably with a cone angle of about 20°. The insert is therefore not self-retaining within the head of the tool holder. It may be inserted in a very simple manner into a recess of a corresponding shape in the tool holder and may be secured therein, for example, by being soldered or cemented therein. If the insert should become damaged or ruined, it is merely necessary to heat the tool holder so that the insert will be loosened in its mounting recess in the head of the holder and may then be removed therefrom.

According to another feature of the invention the mounting insert is made of a material which is harder than the tool holder itself. This increases the stability of the insert as well as of the entire tool and permits the tool holder itself to be made of a less expensive material.

Since according to the invention the central axes of the mounting recess and of the conical insert lie within the same plane and intersect each other within that plane, very favorable cutting conditions will be attained. The common plane of the central axis of the recess and of the conical insert may, for example, extend from the cutting edge to the diagonally opposite edge of the head of the tool holder.

As already mentioned previously, the cutting bit will be held automatically within its recess due to the cutting pressure thereon. However, in order to protect the cutting bit from falling out of the recess when the tool holder is tilted or turned over, it is preferably secured in its operative position within the recess by means of a retaining pin which is held under the action of a spring so as to engage into the central bore or recess in the cutting bit. The spring may simply consist of a piece of bent wire, one end of which is inserted into a groove which is cut into the shank of the tool holder, and the other end of which engages into a transverse bore in the retaining pin. If the retaining pin is pulled back against the action of the spring, the cutting bit will be released within its mounting recess and may then be easily removed therefrom.

Similarly as the cutting tools as were known previously, the cutting tool according to the invention may also be provided with a removable chip breaker. The chip breaker according to the invention consists of a plate which also serves to maintain the spring which acts upon the above-mentioned retaining pin within its operative position. For securing the chip breaker to the tool holder, it is provided with a bore for the insertion of its mounting bolt. It further has a slot terminating into the mentioned bore which has a width greater than the diameter of the mounting bolt. This permits the chip breaker to be removed from the cutting tool merely by loosening the mounting bolt and without requiring the same to be removed entirely.

It constitutes still another feature of the invention that the threaded bore for the mounting bolt may be provided so as to extend not only through the tool holder but also through the mounting insert. In this manner, the mounting bolt will serve as an additional means for securing the mounting insert in its proper position within the tool holder.

In order to increase the stability of the chip breaker, the front part, that is, the chip-breaking part thereof is made of a hard metal. This hard-metal part is preferably soldered to the remainder of the chip breaker.

These and further objects, features and advantages of the present invention will become more apparent from the following detailed description thereof, particularly when read with reference to the accompanying drawings, in which—

FIGURE 1 shows a perspective view of a cutting tool according to the invention in the form of a side-cut tool;

FIGURE 2 shows an enlarged cross section taken along line 2—2 of FIGURES 1 and 3;

FIGURE 3 shows a cross section taken along line 3—3 of FIGURE 1;

FIGURE 4 shows a perspective view of a cutting tool in the form of a straight-cut tool;

FIGURE 5 shows an enlarged cross section taken along line 5—5 of FIGURES 4 and 6;

FIGURE 6 shows a cross section taken along line 6—6 of FIGURE 4;

FIGURES 7, 8, and 9 show different views of the cutting bit for the cutting tool according to FIGURES 1 to 3;

FIGURES 10 and 11 show different views of the cutting bit for the cutting tool according to FIGURES 4 to 6;

FIGURE 12 shows a perspective view of a straight-cut tool according to a modification of the invention;

FIGURE 13 shows a perspective view of a mounting insert for the cutting tool according to FIGURE 12;

FIGURE 14 shows a plan view of the cutting bit for the cutting tool according to FIGURE 12;

FIGURE 15 shows a cross section taken along line 15—15 of FIGURE 14;

FIGURE 16 shows a perspective view of a chip breaker according to the invention;

FIGURE 17 shows a perspective view of a retaining pin;

FIGURE 18 shows a perspective view of a bent-wire spring for the retaining pin according to FIGURE 17;

FIGURE 19 shows a perspective view of the straight-cut tool according to FIGURE 12, but without the chip breaker and cutting bit;

FIGURE 20 shows a plan view of the straight-cut tool according to FIGURE 12;

FIGURE 21 shows a side view of a tool for releasing the cutting bit;

FIGURE 22 shows a cross section taken along line 22—22 of FIGURES 12 and 20; while FIGURE 23 shows a view of the straight-cut tool taken from the left side of FIGURE 19.

Referring to the drawings, FIGURES 7 to 11 particularly show that the cutting blades or bits 1 and 1' are made of a flat stock and have the shape of an equilateral triangle. Each corner of this triangle forms a cutting point and the sides 2, 3, 4 and 2', 3', 4' of the triangle form the cutting edges. For producing these cutting points and cutting edges, the lateral surfaces of each bit are beveled from both sides or roof-shaped, as shown particularly in FIGURES 8, 9, and 11, so that each pair of beveled surfaces defines the front rake of a cutting edge. This is particularly apparent from FIGURES 3 and 6. The two embodiments of a cutting bit according to the invention, as shown in FIGURES 7 to 9 and 10 to 11, respectively, differ from each other merely by the provision of a central bore 5 in the latter embodiment. Thus, as is apparent from the drawings, the cutting bits are in the form of a pair of oppositely directed truncated equilateral pyramids, the respective bases of which are contiguous to one another to define three lateral surfaces and six possible cutting edges.

FIGURES 1 to 6 illustrate in detail the manner in which the triangular cutting bits according to FIGURES 7 to 11 are inserted in the tool holder. The cutting tool according to the invention is shown in FIGURES 1 to 3 in the form of a side-cut tool with a head 6 and a shallow recess 8 therein which extends parallel to the cutting edge 7 of head 6 and in which a cutting bit 1 is mounted. As shown in FIGURES 2 and 3, cutting bit 1 engages with one flat side and two beveled surfaces of sides 3 and 4 with corresponding surfaces of recess 8, while side 2 projects freely upwardly to form the cutting edge. As shown in FIGURE 3, recess 8 extends diagonally into head 6 so that the front clearance angle as well as the side rake are provided in the usual position and size. Recess 8 converges at the inside of head 6 to a point in accordance with the shape of cutting bit 1 and thus also has a triangular shape. As an extension of recess 8, head 6 is provided with a screw-threaded bore 9 into which a setscrew 10 is inserted. Between the inner end of setscrew 10 and cutting bit 1 a cushion 11 of a relatively soft material is interposed. Thus, when setscrew 9 is screwed inwardly, cutting bit 1 will be pushed outwardly from recess 8.

A cutting tool similar to that as shown in FIGURES 1 to 3 is illustrated in FIGURES 4 to 6 which, however, differs from the former by being a straight-cut tool. Accordingly, as shown particularly in FIGURES 5 and 6, the position of recess 8' in head 6' of the shaft of the tool holder is made slightly different. The threaded bore 9' is also in this case provided with a setscrew 10' which through a cushion 11' acts upon the cutting blade 1'. Bit 1' is provided with a central bore 5 into which a setscrew 12' engages which is provided in a threaded bore 13' in head 6'. This setscrew 12' provides an additional support for cutting bit 1' and insures that the bit cannot fall out of head 6' when the opening of recess 8' faces downwardly. The inner end of setscrew 12' is pointed so as to locate cutting bit 1' in the proper position within head 6' and also to press the bit flatly against the opposite wall of recess 8'. FIGURE 5 further illustrates clearly that cutting bit 1' engages with two beveled surfaces and one flat side thereof with the corresponding surfaces of recess 8'.

Instead of using a cutting bit of the type as shown in the drawings, it is also possible to substitute one of any other suitable polyhedral shape so that, if desired, the number of cutting edges on the tool may be further increased. The manner of securing such a cutting bit may be similar to that as described and shown with respect to a triangular bit with beveled sides.

From FIGURES 7 to 11 it will be evident that the triangular cutting bit may be used in six different positions so that in actual practice six cutting edges and cutting points will be available. Thus, the entire bit will not become obsolete until after it has been used in all six positions and after all of the corresponding portions thereof have become dull. With such a large number of available cutting edges on a bit of such small dimensions it is not worth while to regrind the same for further use since the value of the material of the bit is very low as compared to the cost of regrinding it. The worn-out bit may therefore be simply thrown away as being of no further value and be replaced by a new bit which is inserted into the bit holder in the same manner as the former blade.

The cutting tool according to the modification of the invention as illustrated in FIGURES 12 to 23 differs from the tools as previously described by the fact that the recess 8" for mounting the cutting bit is not provided in the tool head 6" itself but within an insert 14 which is fitted into a corresponding recess 15 in head 6". The shape of this insert 14 will be clearly apparent from FIGURE 13. It is of a conical shape with a cone angle of about 20°. At its lowest point, recess 8" merges into a bore 16 which extends coaxially with the recess and continues in head 6" when the insert 14 is mounted in the head recess 15, as shown particularly in FIGURE 22. For removing bit 1" from its recess 8" in the insert 14, it may be pushed out therefrom by a pin which is inserted into the open end of bore 16. Recess 8" is disposed in such a position in the conical insert 14 that the central axes of recess 8" and insert 14 lie within the same plane and intersect each other. In the tool as illustrated in FIGURES 12, 19, 20, 22, and 23, this plane extends from the edge 17 to the diagonally opposite edge 18 of head 6". The central axis of recess 8" then extends vertically to edge 17, whereas the central axis of the conical insert 14 extends obliquely and toward the right end of the shank of the tool holder, as viewed according to FIGURE 12.

Since the cone angle of insert 14 amounts to about 20°, the insert will not be locked of its own accord in the corresponding aperture in head 6". Therefore, in order to secure it therein properly, the insert should be either soldered or cemented into the aperture in head 6". For cementing, it is advisable to use a cement for plastics, for example, one from the group of epoxide resins and preferably a cement known under the trade name of "Araldit." If the insert 14 should become damaged in the course of a cutting operation, it is merely necessary to heat the tool to a temperature sufficient to soften the solder or the cement, whereupon the insert may be easily removed from the tool.

The straight-cut tool as illustrated in FIGURES 12 to 23 further differs from the tools as shown in FIGURES 1 to 6 by the fact that, as evident particularly from FIGURE 12, the tool head 6" is provided with a chip breaker 19. This chip breaker 19 consists of a plate and has a piece of hard metal 20 soldered into its front part so as to increase its stability. As indicated particularly in FIGURE 16, chip breaker 19 has a recess 21 for the passage of a mounting bolt 22 with a socket head which is used for securing the chip breaker 19 on the tool head 6". The screw threads of bolt 22 engage into a threaded bore 23 in tool head 6", the extension 24 of which passes through insert 14, as shown particularly in FIGURE 13, so that the insert is doubly locked in its corresponding aperture in tool head 6".

In order to prevent the cutting bit 1" from falling out of its recess 8" in insert 14 when the tool is turned over or tilted, a bolt 26 is inserted into a transverse bore 25 which terminates into recess 8". This bolt 26 has a pointed tip 27 which engages into a central recess 28 in cutting bit 1", and it also has a transverse bore 29 into which one end 31 of a spring 30 engages which consists of a bent piece of wire. The other end 32 of spring 30 is inserted into a groove 33 which is cut into the shaft of the tool holder. In this position, spring 30 will be secured by chip breaker 19. Another recess 33' is provided in the tool head in order to insure a free movement of the end 31 of spring 30 with bolt 26 thereon. Tool head 6" is further provided with a recess 33" around bore 23 in order to permit spring 30 to pivot within this area.

Chip breaker 19 is clamped down on tool head 6" by means of a washer 34 on the socket head of bolt 22. The face of chip breaker 19 is beveled at 20' so as to prevent any thin chips from penetrating into the gap between the hard-metal piece 20 and tool head 6".

If the cutting bit 1" is to be removed from recess 8" in the insert 14, the lathe operator only needs to take a suitable tool such as shown, for example, in FIGURE 21 and pull bolt 26 against the action of spring 30 out of recess 28 in bit 1", that is, by pulling this tool 35 in the direction as shown by the arrow 36 in FIGURE 20. Tool 35 has a plate-shaped end 37 which then engages into the annular groove 38 in bolt 26. Cutting bit 1″ may then be easily removed from recess 8″.

For inserting a new cutting bit 1″ into recess 8″, no tool is required. Bolt 26 then automatically engages into recess 28 in bit 1″ under the action of spring 30.

The threaded bore 23 for bolt 22 is closed at its lower end by a grub screw 39 to protect bore 23 from being soiled.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A cutting tool comprising, in combination: a body portion and a head portion, a polyhedral-shaped cutting bit of hard cutting material defining a pair of oppositely directed truncated equilateral pyramids, the respective larger bases of which are contiguous to one another in a common plane to form a finite number of substantially flat lateral surfaces adjoining said common plane and elongated cutting edges in said common plane, said head portion being provided with means for receiving said cutting bit, said receiving means defining a recess open at one side and substantially corresponding in form to said cutting bit, said cutting bit being inserted into said open recess thereby abutting at least three surfaces of said recess.

2. A cutting tool comprising, in combination: a body portion and a head portion, a polyhedral-shape cutting bit of hard cutting material defining a pair of oppositely directed truncated equilateral integral pyramids, the respective bases of which having the form of equilateral triangles and are contiguous with their larger bases to one another to form on each side of said common base three lateral surfaces forming three cutting edges in the plane of said common base, said head portion being provided with means for receiving said cutting bit, said receiving means defining a mounting recess substantially corresponding in form to said cutting bit and extending with one apex diagonally into said head portion, said cutting bit being disposed within said recess so that only two pairs of said three lateral surfaces abut the corresponding walls of said recess, the remaining pair of lateral surfaces of said cutting bit forming a cutting edge extending exteriorly of said head portion to occupy a cutting position.

3. A cutting tool as defined in claim 2, wherein the lowest point of said mounting recess within the tool head portion merges into a bore extending coaxially therewith.

4. A cutting tool as defined in claim 3, wherein said bore is provided with screw threads, there being an ejecting screw arranged within said bore and a cushion of relatively soft material interposed between said ejecting screw and said cutting bit.

5. A cutting tool as defined in claim 2, wherein said tool head portion is provided with a threaded bore in one of the side walls of said recess which is not in engagement with the cutting bit, said threaded bore extending from said side into said mounting recess, a clamping screw having a conically pointed tip being disposed within said bore to engage an aperture provided in said cutting bit at the point of intersection of the bisectrices of its sides, the axis of said aperture extending coaxially with the axis of said threaded bore.

6. A cutting tool as defined in claim 2, wherein the mounting recess for the cutting bit is disposed within an insert adapted to fit into said tool head portion.

7. A cutting tool as defined in claim 6, wherein said insert consists of a material harder than that of said tool head portion having a conical shape and being rigidly connected with said tool head portion, the central axes of said mounting recess and said conical insert lie within the same plane and intersect within said plane.

8. A cutting tool as defined in claim 6, wherein said cutting bit is secured in its operative position within said mounting recess by a pin engaging a central bore provided in said cutting bit, a retaining spring acting upon said pin and consisting of a piece of wire, one end of which is inserted into a groove cut into said tool head portion, while the other end is received into a transverse bore provided in said pin.

9. A cutting tool as defined in claim 8, wherein a removable chip breaker is provided consisting of a slotted plate with a hard metal front part, a mounting bolt having a diameter smaller than the width of said slot and extending through said slot into a threaded bore of said tool head portion, said bolt fastening said chip breaker to said tool head portion and maintaining at the same time said retaining spring in its operative position.

10. A cutting tool as defined in claim 9, wherein the threaded bore in the tool head portion for receiving the mounting bolt of the chip breaker also extends through the insert.

References Cited in the file of this patent

UNITED STATES PATENTS

| | | |
|---|---|---|
| 663,455 | Muehlberg | Dec. 11, 1900 |
| 1,438,876 | Thomas | Dec. 12, 1922 |
| 2,378,094 | Nunes-Vaz | June 12, 1945 |
| 2,390,175 | Rogos | Dec. 4, 1945 |
| 2,400,856 | Thompson | May 21, 1946 |
| 2,418,734 | Steffes | Apr. 8, 1947 |
| 2,799,079 | Brigner | July 16, 1957 |
| 2,883,737 | Wilson | Apr. 28, 1959 |

FOREIGN PATENTS

| | | |
|---|---|---|
| 956,473 | France | Aug. 8, 1949 |
| 62,025 | France | Dec. 2, 1954 |
| (Addition to 1,032,421) | | |
| 1,025,299 | France | Jan. 21, 1953 |
| 1,032,421 | France | Mar. 25, 1953 |
| 1,053,737 | France | Sept. 30, 1953 |